United States Patent
Chun et al.

(10) Patent No.: US 9,259,868 B2
(45) Date of Patent: Feb. 16, 2016

(54) INSERT INJECTION-MOLDED CASE

(75) Inventors: Jung-Ho Chun, Gyeonggi-do (KR); Dong-Yup Lee, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 467 days.

(21) Appl. No.: 13/280,578

(22) Filed: Oct. 25, 2011

(65) Prior Publication Data

US 2012/0152792 A1 Jun. 21, 2012

(30) Foreign Application Priority Data

Dec. 17, 2010 (KR) .......................... 10-2010-0130264

(51) Int. Cl.
*B29C 45/14* (2006.01)
*B29K 705/00* (2006.01)
*B29L 31/34* (2006.01)

(52) U.S. Cl.
CPC . *B29C 45/14065* (2013.01); *B29C 2045/14893* (2013.01); *B29K 2705/00* (2013.01); *B29L 2031/3437* (2013.01)

(58) Field of Classification Search
CPC ............ H04M 1/0266; H04M 1/0235; H04M 1/0268; G02F 1/133608; G02F 1/133308; H05K 5/04; B29C 2045/14893; B29C 45/14065; B29K 2705/00; B29L 2031/3437
USPC .......... 455/575.1, 575.3, 575.4, 575.6, 575.8; 361/679.01, 679.02, 679.21–679.29, 361/679.3, 679.55, 679.56
See application file for complete search history.

(56) References Cited

U.S. PATENT DOCUMENTS

| | | | | |
|---|---|---|---|---|
| 4,295,628 A * | 10/1981 | Kupf et al. | ...................... | 249/80 |
| 6,225,778 B1 * | 5/2001 | Hayama et al. | ............... | 320/112 |
| 7,283,375 B2 * | 10/2007 | Chen | .............................. | 361/797 |
| 8,320,978 B2 * | 11/2012 | Chang et al. | ............... | 455/575.1 |
| 8,335,078 B2 * | 12/2012 | Lee et al. | ................. | 361/679.56 |
| 8,558,962 B2 * | 10/2013 | Ogatsu | .......................... | 349/58 |
| 8,629,953 B2 * | 1/2014 | Ogatsu | .......................... | 349/58 |
| 2002/0131207 A1 * | 9/2002 | Oishi et al. | .................... | 360/133 |
| 2005/0037215 A1 * | 2/2005 | Ishiduka et al. | ............. | 428/469 |
| 2005/0280750 A1 * | 12/2005 | Cho et al. | ........................ | 349/58 |
| 2005/0285991 A1 * | 12/2005 | Yamazaki | ...................... | 349/58 |
| 2009/0004408 A1 * | 1/2009 | Nakanishi et al. | ............. | 428/12 |
| 2009/0268120 A1 * | 10/2009 | Ogatsu | .......................... | 349/58 |
| 2010/0124002 A1 * | 5/2010 | Kobayashi et al. | ...... | 361/679.01 |
| 2011/0051330 A1 * | 3/2011 | Lee et al. | ................. | 361/679.01 |
| 2011/0058117 A1 * | 3/2011 | Ogatsu | .......................... | 349/58 |
| 2011/0187958 A1 * | 8/2011 | Ogatsu | .......................... | 349/58 |
| 2011/0287812 A1 * | 11/2011 | Joo | .............................. | 455/566 |
| 2012/0152792 A1 * | 6/2012 | Chun et al. | ................. | 206/524.1 |

* cited by examiner

*Primary Examiner* — Patrick Hawn
(74) *Attorney, Agent, or Firm* — Cha & Reiter, LLC

(57) ABSTRACT

An insert injection-molded case that provides a better appearance and a reduced defective rate of manufacture can be utilized for a number of products, including but not limited to a cover for portable communication devices. The case preferably includes: a metal plate having one or more fixing portions coupled to fixing members formed in a mold respectively; an injection-molded case body injection molded with the metal plate; and one or more holding portions formed in the injection-molded case body during the injection molding and coupled to the fixing members respectively to prevent deflection of the injection-molded case body caused during a cooling operation after the injection molding.

8 Claims, 3 Drawing Sheets

INSERT INJECTION-MOLDED CASE

CLAIM OF PRIORITY

This application claims the priority under 35 U.S.C. §119 (a) from an application entitled "Insert Injection-Molded Case" filed in the Korean Intellectual Property Office on Dec. 17, 2010 and assigned Ser. No. 10-2010-0130264, the contents of which are hereby incorporated by reference in its entirety.

BACKGROUND OF THE INVENTION

1. Field of the Invention

The present invention relates to an insert injection-molded case that is typically used for electronic devices. More particularly, the present invention is related to an insert injection-molded case which includes an injection-molded case body formed during insert injection-molding.

2. Description of the Related Art

In general, an injection molding machine is adapted to injection-mold a resin using a mold to form an injection-molded product such as a housing or case for a portable communication device, a cosmetic case, and a monitor case. In particular, an insert injection-molded product is formed by inserting a metal plate into a mold and injection-molding a resin to integrally form with the metal plate within the mold.

Conventionally, such an injection-molded product is deformed by heat generated during a cooling operation after insert injection-molding.

In order to prevent the deformation problem, a glass fiber (hereinafter, referred to as "GF") resin is contained within an injection-molded product.

However, when a GF resin is contained in a conventionally injection-molded product, glass components of the GF resin disadvantageously protrude from the appearance of the injection-molded product. Thus, as thickness of an injection-molded product increases, the overall slimness of the product is adversely affected. Also, as an outer surface of the injection-molded product is irregular, there is difficulty in depositing a metallic feeling layer or achieve a metallic feeling (for example, a glossy metallic feeling) desired by a user during deposition.

Further, since glass components of the GF resin often protrude from an appearance of the injection-molded product, a defect rate of the product under manufacture is higher than desired and an expensive GF resin is necessary, thus increasing the manufacturing costs of the injection-molded product.

In addition, due to the shifting of a metal plate during insert injection-molding, a failure rate of an injection-molded product disadvantageously increases.

Therefore, there is a need in the art to form an injection-molded product that does not utilize conventional GF resin in order to avoid the drawbacks of such conventional construction.

SUMMARY OF THE INVENTION

Accordingly, the present invention has been made at least in part to solve the above-mentioned problems occurring in the prior art, and an exemplary aspect of the present invention provides an insert injection-molded case which comprises an injection-molded case body with one or more holding portions formed during injection molding and coupled to fixing members formed in a mold so that the holding portions can prevent deflection of the injection-molded case body. The presently claimed invention thereby enhances slimness of a product by using a polycarbonate (PC) resin instead of a conventional GF resin from which glass components protrude, allowing the product to be insert injection-molded with a metal, and allowing a surface of the product to be deposited with a metal (for example, a glossy metallic feeling), and making a design of the product appealing.

The present invention also provides an insert injection-molded case which comprises an injection-molded case body with one or more holding portions formed during injection molding and coupled to fixing members formed in a mold so that the holding portions can prevent deflection of the injection-molded case body, thereby making it possible to finish an exterior of a product excellently and enhance productivity and lowering a failure rate due to deflection of the product.

The present invention further provides an insert injection-molded case which comprises a metal plate with one or more fixing portions fitted thereon and coupled to fixing members formed in a mold, thereby insert injection-molding the metal plate at an accurate position and thus lowering failure rate.

The present invention still further provides an insert injection-molded case which is formed of an inexpensive polycarbonate (PC) resin instead of an expensive GF resin, thereby lowering manufacturing costs of a product, and is adapted to be applied to various products (for example, an inner or outer case of a portable communication device, a cosmetic case, or a monitor case).

In accordance with an exemplary aspect of the present invention, there is provided an insert injection-molded case preferably including: a metal plate having one or more fixing portions coupled to fixing members formed in a mold respectively; an injection-molded case body injection molded with the metal plate; and one or more holding portions formed in the injection-molded case body during the injection molding and coupled to the fixing members respectively to prevent deflection of the injection-molded case body caused during a cooling operation after the injection molding.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
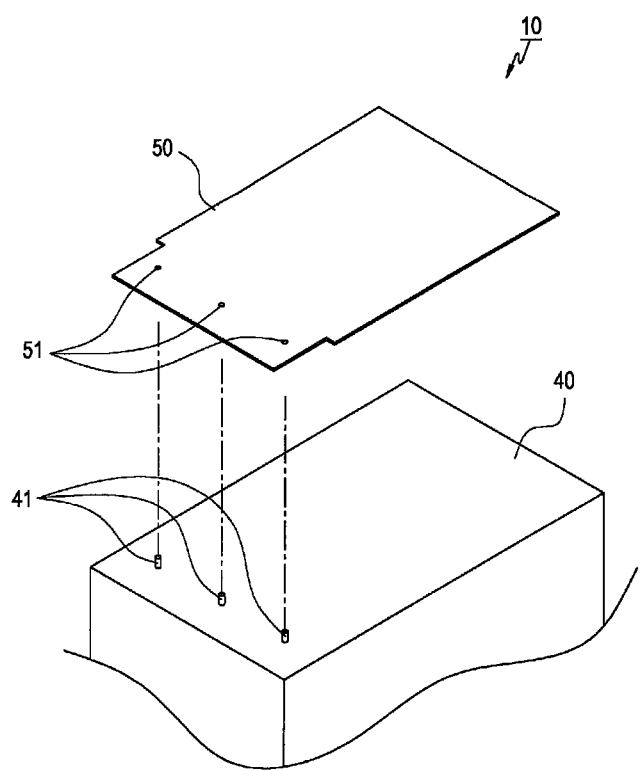
FIG. 1 is an exploded perspective view illustrating an insert injection-molded case according to an exemplary embodiment of the present invention.
Figure 2:
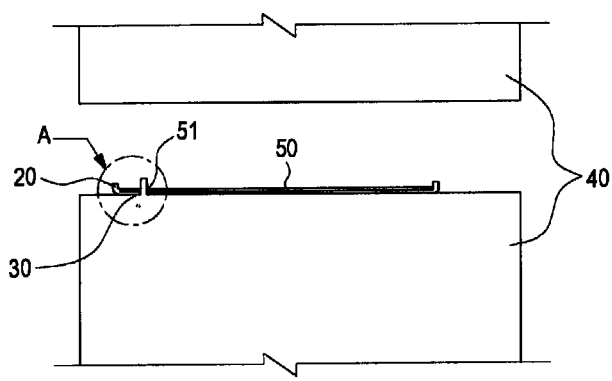
FIG. 2 is a side view illustrating a state of the insert injection-molded case manufactured using a mold according to the exemplary embodiment of the present invention.

Hereinafter, exemplary embodiments of the present invention will be described with reference to the accompanying drawings. It will be understood by a person of ordinary skill in the art that the exemplary embodiments described in the specification and the configurations illustrated in the drawings are merely the most preferred exemplary embodiments of the present invention provided for explanatory purposes and the claimed invention is not limited to the examples shown and described herein. Various modifications and substitutions of the claimed invention as of the time when the subject application is filed are within the spirit of the invention and the scope of the appended claims.

As illustrated in FIGS. 1 to 5, an insert injection-molded case 10 according to an exemplary embodiment of the present invention preferably includes an injection-molded case body 20 (FIG. 3), a metal plate 50 having one or more fixing portions 51, and one or more holding portions 30. The metal plate 50 is configured to be fitted on and coupled to one or more fixing members 41 (FIG. 1) formed in a mold 40, and the fixing portions 51 of the metal plate 50 are fitted onto the fixing members 41 of the mold 40 such that the metal plate 50 is fitted to the mold 40. In this state, the injection-molded case body 20 is insert injection-molded together with the metal plate 50.

Figure 3:
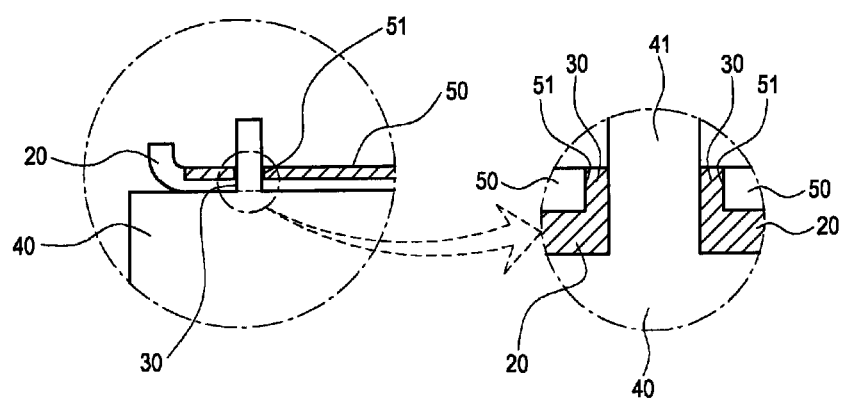
FIG. 3 is an enlarged side view of a portion A of FIG. 2.

Referring to FIG. 3, the holding portions 30 are formed in the injection-molded case body 20 during insert injection molding and are coupled to the fixing members 41 to prevent deflection of the injection-molded case body 20 which may be caused during cooling after the injection molding has occurred.

Figure 4:
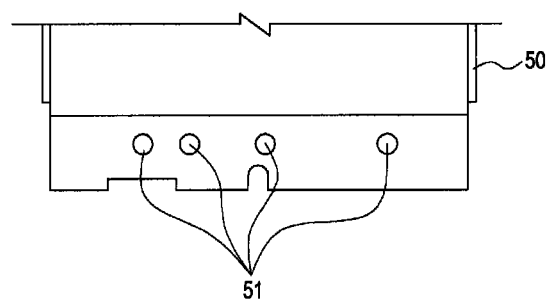
FIG. 4 is a front view illustrating a metal plate of the insert injection-molded case according to the exemplary embodiment of the present invention.
Figure 5:
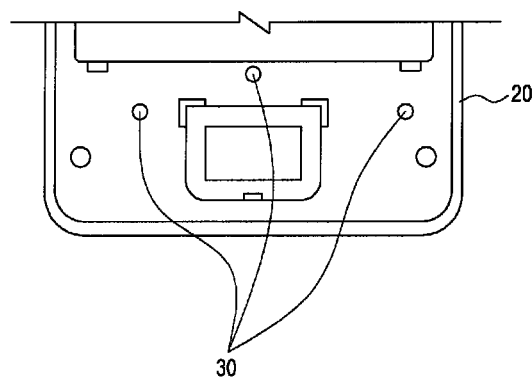
FIG. 5 is a front view illustrating another example of a holding portion of the insert injection-molded case according to the exemplary embodiment of the present invention.

As illustrated in FIGS. 1, 4, and 5, the holding portions 30 respectively have a coupling hole therein, which may have a circular, elliptical, triangular, or quadrangular shape but may also have any suitable shape other than circular, elliptical, triangular, and quadrangular shapes (for example, a diamond shape).

The fixing portions 51 have a fixing hole respectively, and the fixing members 41 have a fixing boss respectively to be coupled to the holding portions 30.

As illustrated in FIGS. 4 and 5, the fixing portions 51 and the holding portions 30 are arranged in a row side by side.

The fixing portions 51 and the holding portions 30 are arranged such that the intervals of the holding portions 30 are either regular or irregular.

The material of the injection-molded case body 20 preferably comprises polycarbonate (PC). The material of the injection-molded case body 20 may be any suitable material other than polycarbonate (PC) (for example, acryl).

The appearance of the injection-molded case body 20 can be customized by depositing a metal or color. An appearance of the injection-molded case body 20 can be customized by depositing any suitable deposition method other than metal deposition and color deposition (for example, deposition with a marble look and/or texture, deposition with a stone look and/or texture, or deposition with a wood look and/or texture).

The injection-molded case body 20 in an exemplary embodiment of the present invention constitutes an outer case for a portable communication device.

While the injection-molded case body 20 according to exemplary embodiments of the present invention may be applied, for example, to an outer case for a portable communication device, the claimed invention is not limited to an outer case for a portable communication device, and may be applied to products of various shapes which require an injection-molded case body 20 (for example, an inner or outer case of a portable communication device, a cosmetic case, or a monitor case).

An example of a portable communication device constructed according to an exemplary embodiment of the present invention may include, for example, all mobile communication terminals operated based on communication protocols corresponding to various communication systems, all information/communication devices such as a portable multimedia player (PMP), an MP3 player, a navigation system, a gaming device, a laptop computer, an advertising panel, a TV, a digital broadcasting player, a personal digital assistant (PDA), and a smart phone, and electronic and multimedia devices including their application devices. For example, the portable communication device would typically in include an RF unit, a transceiver, a encoder/decoder, a memory, display, and an input unit (all not shown), and a processor/controller.

Hereinafter, an operation of the insert injection-molded case according to an exemplary embodiment of the present invention will be described in more detail with reference to FIGS. 1 to 5.

As illustrated in FIGS. 1 to 5, the insert injection-molded case 10 preferably includes a metal plate 50 having one or more fixing portions 51, an injection-molded case body 20, and one or more holding portions 30.

The metal plate 50 is preferably fitted to a mold 40, and the fixing portions 51 of the metal plate 50 are fitted on fixing members 41 of the mold 40.

In this fitted state, the injection-molded case body 20 is insert injection-molded with the metal plate 50 using the mold 40.

Then, one or more holding portions 30 coupled to the fixing members 41 of the mold 40 are formed in the injection-molded case body 20 during the injection molding process.

The holding portions 30 of the injection-molded case body 20 hold the fixing members 41 of the mold 40 when coupled to the fixing members 41 of the mold 40, thus preventing deflection of the injection-molded case body 20 which may be caused by heat generated during cooling after the injection molding.

As illustrated in FIGS. 4 and 5, the fixing portions 51 and the holding portions 30 are arranged in a row side-by-side, making it possible to enhance their coupling forces with the fixing members 41.

In accordance with an exemplary embodiment of the presently claimed invention, the holding portions 30 are disposed at a regular interval or irregularly, making it possible to enhance their coupling forces with the fixing members 51.

Here in this particular example, the injection-molded case body constitutes an outer case of a portable communication device.

In this state, the injection-molded case body 20 after being separated from the mold 40, deflection is prevented because of the holding portions being respectively coupled with the fixing members 51.

Then, since the injection-molded case body 20 is prevented from being deflected, it is finished to have an excellent appearance and there is no shifting of the product.

During a cooling operation after the injection molding portion of the construction process, the holding portions 30 of the injection-molded case body 20 hold the injection-molded case body 20 to prevent deflection of the injection-molded case body 20, thereby reducing the failure rate of the injection-molded case body 20.

As described above, one of the advantages of the presently claimed invention is that since the injection-molded case body 20 is formed of a polycarbonate (PC) resin instead of a conventional GF resin from which glass components protrude during injection molding, the product: can be made slimmer, can be insert injection-molded with a metal, and can be deposited with a metal (for example, a glossy metallic feeling), thereby making the design of the product more appealing.

Another of the advantages of the presently claimed invention is that an inexpensive polycarbonate (PC) resin is used instead of an expensive GF resin, the manufacturing costs of the product can be reduced and the structure can be applied to various products (for example, an inner or outer case of a portable communication device, a monitor case, or a cosmetic case).

Furthermore, since one or more fixing portions are formed in the metal plate, the metal plate can be insert injection-molded at an accurate position, making it possible to lower the defect rate of the manufactured product.

While an insert injection-molded case according to the presently claimed invention has been shown and described with reference to certain exemplary embodiments thereof, it will be understood by those skilled in the art that various changes in form and details may be made therein without departing from the spirit and scope of the invention as defined by the appended claims.

What is claimed is:

1. An insert injection-molded case comprising:
   an injection-molded case body comprising a resin other than a glass fiber; and
   a metal plate that is substantially flat and continuous, the metal plate having one or more fixing portions wherein each fixing portion of the metal plate is configured to receive a fixing member formed on a mold when the metal plate is positioned on the mold, between each fixing portion and each fixing member there is provided a predetermined space when the injection-molded case body is disposed between the metal plate and the mold, the space between each fixing portion and each fixing member forms a holding portion in the injection-molded case body during insert injection-molding, and each holding portion includes resin that enters into each of the spaces from a surface of the injection-molded case body to a surface of the metal plate between each fixing member and an adjoining surface of the corresponding fixing portion and each holding portion is formed unitarily with the injection-molded case body such that each holding portion serves to prevent deflection of the injection-molded case body during cooling.

2. The insert injection-molded case as claimed in claim 1, wherein each holding portion of said one or more holding portions has a coupling hole with a circular, elliptical, triangular, or quadrangular shape.

3. The insert injection-molded case as claimed in claim 1, wherein each fixing portion of said one or more fixing portions has a fixing hole respectively and each fixing member of said one or more fixing members has a fixing boss.

4. The insert injection-molded case as claimed in claim 1, wherein the one or more fixing portions and the one or more holding portions are arranged in a row side-by-side such that the holding portions are regularly spaced from each other.

5. The insert injection-molded case as claimed in claim 1, wherein the one or more fixing portions and the one or more holding portions are arranged in a row side-by-side such that the holding portions are irregularly spaced from each other.

6. The insert injection-molded case as claimed in claim 1, wherein the injection-molded case body is formed of polycarbonate, and a metal is deposited on a surface of the injection-molded case body.

7. The insert injection-molded case as claimed in claim 1, wherein the injection-molded case body is formed of polycarbonate, and a color is deposited on a surface of the injection-molded case body.

8. The insert injection-molded case as claimed in claim 1, wherein the injection-molded case body comprises an outer case of a portable communication device.

* * * * *